United States Patent Office 3,681,230
Patented Aug. 1, 1972

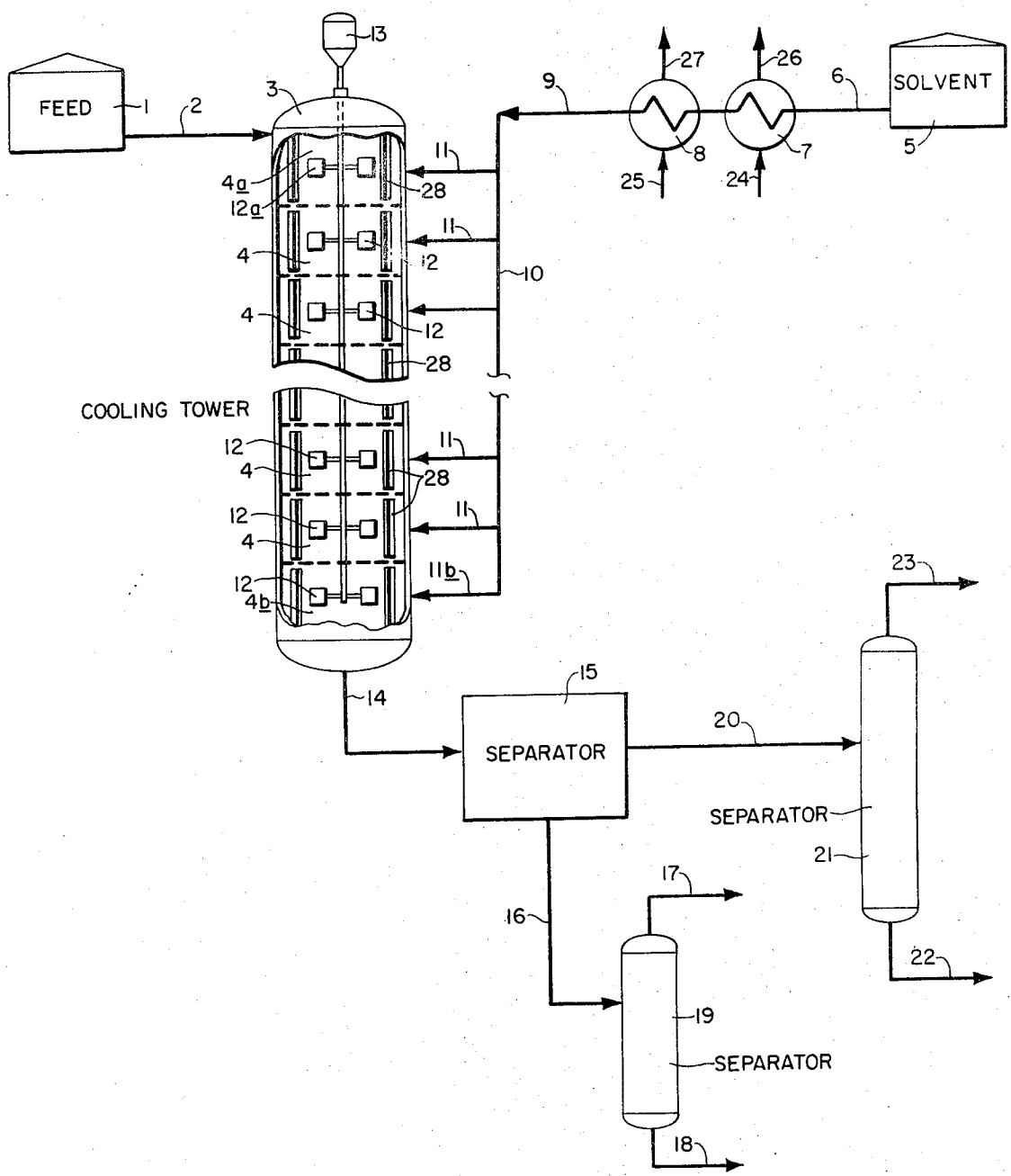

---

3,681,230
IMMISCIBLE FILTRATION OF DILUTION CHILLED WAXY OILS
John F. Eagen, Sarnia, Ontario, Canada, and John F. Richards, Baton Rouge, La., assignors to Esso Research and Engineering Company
Filed July 10, 1970, Ser. No. 53,806
Int. Cl. C10g 43/08
U.S. Cl. 208—33
14 Claims

ABSTRACT OF THE DISCLOSURE

In the dewaxing of high viscosity lube oils by direct chilling of the oil with a solvent in a plurality of intensely agitated stages, the solvent composition is so chosen that the oil is miscible with the solvent during most of the cooling but becomes immiscible near the separation temperature so that filtration occurs under immiscible conditions with improved yields and filter rate.

BACKGROUND OF THE INVENTION

This invention relates to a process for dewaxing high viscosity lube oil stocks. More particularly this invention relates to a process wherein the wax is precipitated by incremental or continuous addition of a prechilled solvent along the height of a multistaged intensely agitated vertical tower. Still more particularly this invention relates to a process wherein a solvent composition is used in which its miscibility with oil is decreased as the temperature is lowered. Thus the solvent is chosen so that it is completely miscible at the beginning of the mixing and cooling step but becomes immiscible at the temperature of separation.

It is known in the prior art to dewax petroleum oil stocks by cooling an oil/solvent solution in a scraped surface exchanger. In this type process, the oil and selective solvent are admixed at a temperature sufficient to effect thorough solution of the oil in the solvent. The extent of dilution is dependent upon the particular oil and the particular solvent employed and is adjusted to facilitate easy handling and optimum filtration rates. The solution is cooled at a uniformly slow cooling rate; e.g. 1–5° F./min. Notwithstanding the carefully controlled conditions used in this type process, there are several deficiencies which hamper successful commercial operation. Most significant among these deficiencies is the loss of good heat transfer due to wax deposition on the exchange surfaces. Such fouling has been repeatedly noted after short periods of operation; e.g. 24–48 hours. Associated directly with the loss of good heat transfer is the loss of careful control over the cooling rate and a corresponding loss of uniform crystal growth. This non-uniform crystal growth then results in lower filtration rates. The high pressure drop through the chilling section due to wax deposition also reduces the maximum feed rate attainable.

It is also known in the prior art to dewax petroleum lubricating oil with hydrocarbon solvents in a two-step process. In the first step, an oil-solvent solution is cooled to a temperature just above that at which the wax begins to precipitate. In the second, the wax is precipitated upon further cooling of the solution by incremental addition of prechilled solvent along the height of a vertical tower. Prechilling of the oil/solvent solution prior to the use of internal cooling by incremental solvent addition is taught as a step essential to the avoidance of the detrimental effects of shock chilling. Moreover, as in the external cooling processes, the prior art teaches that any degree of substantial agitation should be avoided during the wax precipitation step. The principal disadvantages of this type process are the expense and operating problems associated with the required separate oil-solvent blending equipment and the additional heat exchange equipment employed in the first cooling step. It is also felt that a certain amount of shock chilling still occurs in this type process with resultant lower filter rates and yields.

In copending application for Donald B. Hislop, Ser. No. 17,869, filed Mar. 9, 1970 now abandoned, there is proposed a method of dewaxing oils in which the oil is shock chilled by contacting it with a cold solvent at a plurality of points along a vertical tower while maintaining a zone of intense agitation at each point of solvent injection such that substantially instantaneous mixing occurs at each point, i.e. within a second or less.

In the Hislop process all the chilling of the slurry is accomplished by the cold solvent. The intense agitation more than overcomes the well-known harmful effects of shock chilling and results in the formation of a wax slurry having a unique crystal structure with markedly superior filtering characteristics which in turn gives a relatively high filter rate and good dewaxed oil yield.

In scraped surface and other conventional processes, optimum performance is normally obtained by using a mixed solvent composition which is just miscible with the oil at the filtration temperature. Since miscibility of the solvent with the oil increases with solvent molecular weight, higher concentrations of the more miscible (higher molecular weight) solvent, usually a ketone, decreases the filterability whereas a decrease in concentration causes immiscibility with accompanying disadvantages. Under these immiscible conditions usually a substantial increase in filter rate is obtained at the expense of dewaxed oil yield and viscosity index. When the solvent and oil are immiscible, oil droplets are formed which are trapped in the wax cake and cannot be removed by washing. Consequently the dewaxed oil yield is reduced. Furthermore, since the immiscible portion is usually the high VI oil, the overall VI of the dewaxed oil is also reduced. Plants having to process high viscosity feedstocks quite often operate under immiscible conditions because (1) the throughput is increased and since these feeds are not usually considered as premium the yield is of little importance, and (2) the solvent composition in most plants cannot be adjusted for a miscible operation of these feeds. Combination of these two factors forces the plants to operate under immiscible conditions. Thus it has been found more economical to operate under somewhat immiscible conditions taking the yield loss rather than tie up the plant for excessive filtration or invest in extra filters or solvent adjustment facilities.

SUMMARY OF THE INVENTION

It has now been found that important advantages can be obtained by dewaxing the high viscosity oils under dilution chilling conditions in which the oil is miscible with the solvent at the mixing temperature but becomes immiscible at the wax separation temperature. By operating under such immiscible conditions the filter rate and dewaxed oil yield of high viscosity oils can be obtained at the same level as those obtained when processing lower molecular weight lube distillates under miscible conditions.

Therefore in accordance with this invention, the high viscosity lubricating oil stock is cooled by introducing it into either the top or bottom of a vertical tower with a prechilled mixed solvent which is introduced incrementally along the height of the tower under intense agitation at each point of solvent injection. It is critical in this invention that the mixed solvent ratio be so chosen at each point of solvent injection that the oil and solvent are at first completely miscible until a specific temperature above a predetermined temperature set for the last stage is reached at which the oil and solvent are immiscible. The mixture is withdrawn from the tower and passed to the separation means either directly, or via a scraped surface exchanger if additional chilling is required at a temperature below the miscibility temperature of the oil-solvent mixture. It is also critical that the degree of agitation in the vertical tower be sufficient to permit substantially instantaneous mixing of the oil and solvent. The temperature of the solvent and its rate of addition at each point along the tower are controlled so as to permit a desired cooling rate of the oil. The high degree of agitation offsets the deleterious effects of shock chilling and permits operation at reasonable cooling rates. The wax which precipitates during the cooling stage may be separated from the solution by conventional means known to the art. Following separation of the wax, the oil which has a reduced pour and cloud point is recovered from the solution by means well known in the art.

BRIEF DESCRIPTION OF THE DRAWING

The sole figure is a flow diagram of the dewaxing process.

DETAILED DESCRIPTION

Referring to the figure, the oil stock to be dewaxed is conducted from the storage tank 1, through line 2, to the top of the vertical cooling tower 3, where it enters the first stage of the cooler 4a. The selected solvent is passed from storage tank 5 through line 6, through heat exchangers 7 and 8, where the solvent temperature is reduced to that sufficient to cool the oil to the desired dewaxing temperature. Coolant enters the heat exchangers 7 and 8 through lines 24 and 25, respectively and leaves through lines 26 and 27. The solvent leaves the heat exchanger 8, through line 9, and enters manifold 10. The manifold comprises a series of parallel lines providing solvent inlets 11 to the several stages of the cooling tower 3. The rate of flow through each inlet is regulated by flow control means (not shown). The rate of solvent gradient along the height of the cooling tower 3. The first portion or increment of the solvent enters the first stage, 4a, of the cooling tower 3 where it is substantially instantaneously admixed with oil due to the action of the agitator 12a. The agitator is driven by a motor 13 and the degree of agitation is controlled with due allowance for the flow rate through the cooling tower. The oil-solvent mixture may pass upwardly or downwardly through the cooling tower 3 (downward flow only has been shown). At various heights along the cooling tower, additional prechilled solvent is introduced to each of the several stages 4, through inlets 11 so as to maintain a substantially constant cooling rate and at the same time to provide the desired degree of dilution. It should be noted that any number of stages up to fifty may be employed; however, at least six should be used. The oil-solvent solution with precipitated wax passes from the final stage of the cooling tower through line 14 to means for separating the wax from said solution 15. Any suitable means such as filtration or centrifugation for such separation may be employed. The wax-solvent is removed from the separation means through line 16. The solvent is recovered in a suitable separating system 19, which is preferably distillation, through line 17 and the wax exits through line 18. The oil-solvent solution leaves the wax separation means through line 20 and passes to means for separating the oil from solution 21. Any suitable means for this separation may be used, such as distillation or selective adsorption. The oil is removed from the separator and is recovered through line 22. The solvent is removed through line 23. The solvent may be recycled directly or scrubbed to remove impurities before reuse.

The lubricating oil fractions particularly suitable for use in this invention are the high viscosity waxy oils which have more limited miscibility with mixed solvents. Such high viscosity fractions may be more particularly described as follows:

(1) Mid-Continent (MCT–60) 1400 neutral)

| | |
|---|---|
| Boiling range | 950–1120° F. |
| Gravity | 28 API°. |
| SUS at 210° F. | 97. |
| Pour point | 120° F.+. |
| Solvent composition required | 50/50 MEK/MIBK (13° F. below miscibility at 25° F. filtering temperature). |

(2) Bright stocks

Suitable selective solvents include the mixed ketones having three to six carbon atoms such as methylethylketone (MEK), methylbutylketone, and methylisobutylketone (MIBK), or mixtures as well as mixtures of propane or propylene and acetone and other similar mixed solvents which are miscible in some concentrations and become immiscible as the composition and/or temperature changes.

During the operation of the process of the present invention, the petroleum oil stock is fed to the cooling tower 3 at a temperature which can be either above or below its pour and cloud point. In the case of an oil fraction containing a relatively low amount of wax, the oil may be fed at storage temperature. In the case of an oil containing a relatively large amount of wax an elevated temperature will be used. In general, the wax content of the oil feed will vary between ten and twenty-five weight percent and the pour and cloud points will range between 70 and 170° F. and 75 and 175° F., respectively. In general, a feed rate between 100 and 600 bbl./hour will be used; however, it will be apparent to those skilled in the art that higher or lower feed rates can be used.

The solvent, or solvent mixture, will be prechilled to a temperature sufficient to permit cooling of the oil to the desired temperature. It will be apparent to those skilled in the art that the exact temperature employed will depend upon the amount of oil to be cooled and the amount of solvent to be added to the oil; i.e. the degree of dilution which is sought during the filtration step. The prechilled solvent is added incrementally along the height of the cooling tower so as to maintain a chilling rate below about 8° F./minute and preferably between 1 to about 5° F./minute. In general, the amount of solvent added will be sufficient to provide a liquid/solid weight ratio between the range of 1/1 and 20/1 at the dewaxing temperature and a solvent/oil volume ratio between 1.5/1 and 5/1.

A mixture of MEK and MIBK becomes immiscible with the oil near the tower outlet temperature. Since the oil/solvent mixture reaches the filtering temperature in the last stage or in succeeding scraped surface chillers, this means that the oil/solvent mixture will be miscible in all stages except near the last, i.e. near the top or bottom of the tower, depending on whether downflow or upflow is used.

In some cases it may be desirable to carry out the chilling in the tower only part of the way and to finish up the chilling in a conventional scraped surface exchanger as described in S.N. 36,276, filed May 11, 1970, for Eagen, Gudelis and Perry and now abandoned. In this case the temperature of the oil-solvent-wax mixture leaving the tower is preferably less than 35° F. above the wax separation temperature. However the combination of dilution chilling with scraped surface chilling is not limited to the conditions described in S.N. 36,276 but are suitable for situations where the temperature difference cannot be maintained as in dewaxing to very low temperatures, e.g. −80° F., where the temperature differential may be as great as 60° F. It follows that if such a combination case is used in accordance with the present invention the oil and solvent are completely miscible throughout the tower and leave it still miscible. It is only in the scraped surface exchanger that conditions are reached where immiscibility obtains.

In general, the degree of agitation required in this invention can be achieved when the modified Reynolds Number (Perry, "Chemical Engineer's Handbook," 3rd, p. 1224, McGraw-Hill, New York, 1959), $N_Re$, which is defined by the equation:

$$N_Re = L^2 n l / \mu$$

Where

L = agitator diameter, ft.
l = liquid density, lb./ft.$^3$
n = agitator speed, r.p.s.
$\mu$ = liquid viscosity, lb./ft. sec.

is between about 200 and about 100,000 and the dimensionless ratio of cooling tower diameter to agitator diameter is between about 1.5/1 and about 10/1. A turbine type agitator is preferred; however, other types of agitators such as propeller and disc may be used.

The cooling tower may or may not be baffled, but a baffled tower is preferred. The tower is divided into several cooling stages by horizontal or dished circular plates which restrict flow between the stages to an opening in the center of the tower. In general, the dimensionless ratio of the diameter of the restricted flow opening to the diameter of the tower will be between about 1/3 and about 1/100.

In general, the cooling tower will be operated at a pressure sufficient to prevent flashing of the solvent. Atmospheric pressure is sufficient when the ketones are employed as solvents.

PREFERRED EMBODIMENT

The invention will be more apparent from the preferred embodiment and working examples set forth below. Turning again to the drawing, a lubricating oil distillate fraction, having a boiling range from within 800 to 1300° F., a wax content of from about 8 to about 35 weight percent, and initial pour and cloud points between about 130 and 175° F. and 135 and 180° F., respectively, is fed from the storage tank 1 through line 2 to the first stage 4a of the cooling tower 3. A solvent consisting of a mixture of methylethylketone and methylisobutylketone is passed from storage tank 5 through line 6 to the heat exchangers 7 and 8, where the solvent is cooled by conventional means to a temperature between —15 and —25° F. In the preferred embodiment cold filtrate from the separator 21 is used to precool the solvent in heat exchanger 7. The filtrate enters through line 24 and leaves through line 26. The solvent is further cooled in heat exchanger 8 with liquid propane or other suitable coolant, entering through line 25 and leaving through line 27. It is preferred that the solvent be prechilled to a temperature which will permit cooling of the oil to a temperature between about 0° F. and 40° F. although lower temperatures can be used. The cooled solvent passes from the heat exchanger 8 through line 9 to the manifold 10. In the preferred embodiment the cooling tower is divided into sixteen stages, 4, and the manifold consists of sixteen parallel solvent inlets 12. The flow rates are adjusted to give the desired temperature drop per stage. Each of the sixteen separate stages is provided with an agitator turbine 12 which is turned at a sufficiently high r.p.m. to produce adequate mixing. The oil and solvent entering the first stage 4a is substantially instantaneously mixed. As the oil-solvent mixture passes downwardly through the cooling tower, it is substantially instantaneously mixed with additional solvent which is added to each stage. As a result of the instantaneous mixing of the warmer oil or oil solvent mixture with the added solvent, the temperature of the total mixture is substantially instantaneously reduced in each stage. In this way, the adverse effects of shock cooling are minimized.

Immiscibility temperatures may be reached either near the tower outlet or in a succeeding scraped surface exchanger.

The oil-solvent mixture leaves the bottom of the cooling tower as an immiscible mixture of oil and solvent containing precipitated wax. The mixture passes through line 14 to a separating means 15 which is preferably a rotary vacuum filter. The wax-solvent is passed through line 16 to a liquid-liquid separating means 19 which is preferably distillation. The wax is recovered through line 18 and the ketone solvent is recovered through line 17. The oil-solvent mixture is passed through line 20 to a liquid-liquid separating means which is preferably distillation. The dewaxed oil is recovered through line 22 and the mixed ketones solvent is recovered through line 23. The dewaxed oil which now has a reduced pour point and cloud point may be used directly. The solution-wax mixture may also be further chilled as it exits from the tower 3 through line 14 in conventional scraped surface exchangers prior to the filtration step. In such a case the temperature at which the oil and solvent become immiscible may not be reached until the subsequent cooling in the scraped-surface chillers.

EXAMPLE 1

Using the preferred embodiment described above, a heavy neutral lubricating oil having the following specifications:

Boiling range—825–1050° F.
Gravity, API—29.3°
Dry wax content—15%
Pour point—130
Cloud point—132 was dewaxed according to the process of this invention. The oil fraction was fed at a rate of 200 cc./min. and at a temperature of 130° F. MIBK was used as the solvent in the beginning. The solvent was prechilled to —20° F. and introduced through the parallel inlets in volumes which increased from stage to stage to give equivalent temperature drops per stage. The total solvent feed rate was 660 cc./min. A mixture of 30% MEK and 70% MIBK was added in the last stage so that the oil-solvent-wax mixture was removed from the last stage in an immiscible condition at a temperature of 0° F.

The precipitated wax was removed from the oil-solvent solution by filtration at 0° F. The oil was recovered from solution by distillation.

The following data compare the results obtained by the above process and that obtained by a typical commercial plant operation using the same feed but employing scraped surface chillers instead of the process of the present invention.

DEWAXING SOLVENT HEAVY NEUTRAL

|  | Dilution chilling | Typical plant |
|---|---|---|
| Filtration stages | 1 | 1 |
| Solvent composition, MEK/MIBK | 30/70 | 30/70 |
| Filter temperature, ° F | 0 | 0 |
| Miscibility temperature, ° F | +15 | +15 |
| Total solvent/feed | 4.7 | 4.4 |
| DWO yield, percent | 78 | 67 |
| DWO filter rate, USG/hr.-ft.$^2$ | 2.4 | 1.4 |

EXAMPLE 2

A lubricating oil having the same properties as in Example 1 was dewaxed in accordance with the process described in Example 1 and the results compared with those obtained when using the same process except the ratio of the mixed solvent is maintained so that the oil and solvent are miscible at the filtering temperature of 0° F. A comparison is also made with the results obtained when using a scraped surface chiller operating under both miscible and immiscible conditions. The following results were obtained:

COMPARISON OF IMMISCIBLE FILTRATION
[Dilution chilling vs. scraped surface chilling—single stage filtration]

| Filtration | Immiscible | | Miscible | |
|---|---|---|---|---|
| | Dilution chilling | SS chilling | Dilution chilling | SS chilling |
| Dewaxed oil filter rate (USG DWO/ft.² hr.) | 2.9 | 1.4 | 2.6 | 1 |
| Yield (percent DWO) | 82 | 60 | 80 | 66 |

The data in Examples 1 and 2 clearly show the advantages in yield and filter rate when employing the immiscible phase operation of the present invention on high viscosity feeds as compared to immiscible phase operation with scraped surface chillers and with miscible phase operation using both dilution chilling and scraped surface chilling.

EXAMPLE 3

A South Louisiana heavy solvent neutral lubricating oil having the same properties as those of Example 1 was dewaxed in a commercial plant using the process of the present invention. A mixture of 34% MEK and 66% MIBK was fed to the dilution chilling tower at a temperature of −8° F. and introduced through parallel inlets in volumes, increasing from stage to stage until 4.2 volumes of solvent per volume of feed were added so as to give equivalent temperature drops per stage. The solvent was miscible with the oil about 20° F., and was reduced in temperature from 142° F. in the first stage to 26° F. in the last. The mixture of solvent and oil at 26° F. was then fed to a conventional scraped surface chiller from which it was removed and filtered at a temperature of 8° F. under immiscible conditions. The filter was washed with 1.3 volumes of solvent per volume of feed to filter. The following data were obtained.

| | Dilution chilling | Conventional chilling scraped surface |
|---|---|---|
| Total solvent/feed ratio | 5.5 | 5.5 |
| DWO filter rate | 3.3 | 1.0 |
| DWO yield | 79.1 | 76.8 |
| Percent oil in wax | 28.1 | 35.3 |

The above data show that commercial plant operation of the present invention affords the same advantages as shown by pilot plant data. The dewaxed oil (DWO) filter rate and the DWO yield, are increased, and the percent oil in wax is decreased.

The nature and advantages of the present invention having thus been fully set forth and illustrated and specific advantages of the same given, what is claimed as new, useful and unobvious and desired to be secured by Letters Patent is:

1. A process for dewaxing a waxy lubricating oil stock comprising introducing said oil stock into a chilling zone divided into a plurality of stages, introducing a dewaxing solvent into at least a portion of said stages thereby cooling said oil, said solvent having a composition such that said solvent is miscible with said lubricating oil stock until a predetermined temperature is attained below which said oil stock and said solvent are immiscible, maintaining the degree of agitation in at least a portion of said stages so as to effect substantially instantaneous mixing of said solvent and said oil in said stages, cooling said oil-solvent mixture as it progresses through the chilling zone, withdrawing said mixture at a temperature at which said oil and said solvent are miscible, cooling said mixture to the wax separation temperature thereby precipitating at least a portion of the wax from said oil-solvent mixture and producing an oil-solvent-wax mixture wherein said solvent and said oil are immiscible and separating said precipitated wax from said oil-solvent-wax mixture at a temperature at which said oil and solvent are immiscible.

2. The process of claim 1 in which methylisobutylketone is added to the upper portion of said chilling zone and a mixture of methylethylketone and methylisobutylketone is added to the lower portion of said chilling zone to aid in producing immiscible conditions.

3. The process of claim 2 in which the temperature at which the wax precipitates from the wax-containing oil is between 0 and 40° F.

4. The process of claim 3 in which the temperature at which the wax separates from said wax-containing oil is 0° F. and the solvent added to the lower portion of said cooling zone is a mixture of 30% methylethylketone and 70% methylisobutylketone.

5. The process of claim 1 wherein said predetermined temperature is the wax separation temperature.

6. The process of claim 1 wherein said solvent is selected from the group consisting of ketones containing 3 to 6 carbon atoms per molecule and mixtures thereof.

7. The process of claim 6 wherein said solvent is selected from the group consisting of methylethylketone, methylbutylketone, methylisobutylketone and mixtures thereof.

8. The process of claim 1 wherein said solvent comprises a mixture of a ketone and a hydrocarbon.

9. The process of claim 8 wherein said solvent comprises a mixture of acetone and propane or propylene.

10. The process of claim 1 wherein said solvent is introduced into said chilling zone at a cooling rate sufficient to give equal temperature drop per stage.

11. A process for dewaxing a waxy lubricating oil stock comprising introducing said oil stock into a chilling zone divided into a plurality of stages, introducing a cold dewaxing solvent into at least a portion of said stages thereby cooling said oil, said solvent having a composition such that said solvent is miscible with said oil until a predetermined temperature is attained below which said oil and said solvent are immiscible, maintaining the degree of agitation in at least a portion of said stages so as to effect substantially instantaneous mixing of said solvent and said oil in said stages, cooling said oil-solvent mixture as it progresses through the chilling zone thereby precipitating at least a portion of the wax contained in said oil and forming an oil-solvent-wax mixture, effecting a temperature in said chilling zone at which said oil and said solvent are immiscible, withdrawing said immiscible oil-solvent-wax mixture from said chilling zone and separating the precipitated wax from said mixture at a temperature at which said oil and said solvent are immiscible.

12. The process of claim 11 in which the oil-solvent mixture is removed from said chilling zone at a temperature at which said oil and said solvent are miscible and cooled in a scraped-surface chiller to a separation temperature at which at least a portion of the wax in said oil is precipitated therefrom.

13. The process of claim 12 in which a mixture of 34% methylethylketone and 66% methylisobutylketone is introduced into each stage of the cooling zone.

14. A process for dewaxing a highly viscous wax-containing lubricating oil fraction comprising introducing said fraction into a tower divided into a plurality of agitated stages, introducing a cold dewaxing solvent into each of said agitated stages at a cooling rate sufficient to give equal temperautre drop per stage, said solvent having a composition such that said solvent is miscible with said oil until a predetermined temperature is attained below which said solvent and said oil are immiscible, maintaining the degree of agitation in each of said stages so as to effect substantially instantaneous mixing of said oil in each of said stages, cooling said mixture as it progresses through said tower thereby precipitating at least a portion of said wax from said wax-containing oil and effecting a final stage temperature in said tower at which said oil and said solvent are immiscible, withdrawing the immiscible oil-solvent-wax mixture from said tower and separating the precipitated wax from said mixture at the same temperature at which the mixture was removed from the tower and at a temperature at which said oil and said solvent are immiscible.

References Cited

UNITED STATES PATENTS

| | | | |
|---|---|---|---|
| 2,689,205 | 9/1954 | Clarke | 208—33 |
| 2,451,545 | 10/1948 | Ferris | 208—33 |
| 2,410,483 | 11/1946 | Dons et al. | 208—33 |

HERBERT LEVINE, Primary Examiner

U.S. Cl. X.R.

208—37